United States Patent [19]

Suzuki et al.

[11] Patent Number: 5,563,726
[45] Date of Patent: Oct. 8, 1996

[54] DATA PROCESSOR FOR PREVENTING BLOCK DISTORTION FOR AN ACHROMATIC IMAGE WHEN IMAGE DATA ARE PROCESSED FOR CODING BY DIVIDING THEM INTO BLOCKS

[75] Inventors: Hiroyuki Suzuki, Toyokawa; Munehiro Nakatani, Toyohashi; Kazuomi Sakatani, Toyokawa, all of Japan

[73] Assignee: Minolta Co., Ltd., Osaka, Japan

[21] Appl. No.: 286,669

[22] Filed: Aug. 5, 1994

[30] Foreign Application Priority Data

Aug. 6, 1993 [JP] Japan ................... 5-196349

[51] Int. Cl.$^6$ ............... H04N 9/65; H04N 9/68; H04N 1/46; G03F 3/08
[52] U.S. Cl. ............ 358/539; 358/515; 358/518; 348/642; 348/645
[58] Field of Search .................. 358/539, 515, 358/516, 518, 520; 348/391, 642, 645, 649, 65 D, 420; H04N 1/46, 7/12, 11/02, 11/04, 9/65, 9/68, 9/64; G03F 3/08

[56] References Cited

U.S. PATENT DOCUMENTS

| | | | |
|---|---|---|---|
| 4,167,750 | 9/1979 | Tomimoto et al. | 348/645 |
| 4,845,548 | 7/1989 | Kohno et al. | 348/279 |
| 4,903,142 | 2/1990 | Hasebe et al. | 358/457 |
| 4,984,076 | 1/1991 | Watanabe | 348/405 |
| 5,031,034 | 7/1991 | Shimizu et al. | 358/529 |
| 5,060,060 | 10/1991 | Udagawa et al. | 358/520 |
| 5,319,448 | 6/1994 | Ohki et al. | 348/645 |
| 5,418,575 | 5/1995 | Kaneko et al. | 348/645 |

FOREIGN PATENT DOCUMENTS

| | | |
|---|---|---|
| 0469852A2 | 2/1992 | European Pat. Off. . |
| 0549238 | 6/1993 | European Pat. Off. . |
| 3-181231 | 8/1991 | Japan . |
| 4-220083 | 8/1992 | Japan . |
| 05260503 | 10/1993 | Japan . |

OTHER PUBLICATIONS

"DCT Image Coding Using Adaptive Quantization Application To Digital Color Copiers" by Kazuyuki Murata (Gazou Denshi Gakkaishi; vol. 20, No. 5 (1991) (467).

*Primary Examiner*—Kim Yen Vu
*Assistant Examiner*—Kimberly A. Williams
*Attorney, Agent, or Firm*—Brinks Hofer Gilson & Lione

[57] ABSTRACT

In data processing wherein image data are processed by dividing them into blocks, a chroma data W is obtained from the color difference data $W_R$ and $W_B$, and the color difference data $W_R$ and $W_B$ are corrected according to an amplitude of the chroma data W. For example, if the chroma W is smaller than a prescribed threshold value, the color difference data $W_R$ and $W_B$ are set as zero. Then, the so-called block distortion can be prevented. The degree of the correction may depend on the amplitude of the chroma data W. On the other hand, DC coefficients of discrete cosine transform coefficients of adjacent blocks are compared with each other. When the DC coefficients are different from each other, block distortion occurs if they represent a same image. Then, if differences of DC coefficients of discrete cosine transform coefficients of adjacent blocks are small with each other, the DC coefficients are corrected to tend to have similar values. As to the AC coefficients, a comparator compares absolute values of AC components in the DCT coefficient data received from a discrete cosine transform section with a prescribed threshold value. Then, if absolute values of AC components in the DCT coefficient data are smaller than a prescribed threshold value, the values of the AC components are not sent to a coding section because in such cases read errors or the like are thought to affect the AC components.

3 Claims, 10 Drawing Sheets

Fig. 7

| $D_{\alpha-1,\beta-1}$ | $D_{\alpha,\beta-1}$ | $D_{\alpha+1,\beta-1}$ |
|---|---|---|
| $D_{\alpha-1,\beta}$ | $D_{\alpha,\beta}$ | $D_{\alpha+1,\beta}$ |
| $D_{\alpha-1,\beta+1}$ | $D_{\alpha,\beta+1}$ | $D_{\alpha+1,\beta+1}$ |

Fig. 8A

| -339 | -6 | 0 | -1 | 0 | 0 | 0 | 0 |
|---|---|---|---|---|---|---|---|
| 0 | 0 | 1 | 0 | 0 | 0 | 0 | 0 |
| -1 | 0 | 1 | 0 | 0 | 0 | 0 | 0 |
| 0 | 0 | 0 | 0 | -2 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

← DC Component (-339); AC Components →

Fig. 8B

| -749 | 0 | 0 | 1 | 0 | 0 | -2 | 0 |
|---|---|---|---|---|---|---|---|
| -2 | -5 | 1 | 0 | -1 | 0 | 2 | 0 |
| 2 | -1 | -3 | 2 | 0 | 1 | 2 | -1 |
| -1 | 0 | 0 | 2 | 1 | 1 | -2 | 0 |
| 6 | 4 | -5 | 2 | 1 | 6 | 5 | -1 |
| -12 | 2 | -4 | -2 | -1 | -3 | 5 | 1 |
| 3 | 3 | -9 | 0 | 0 | 0 | 1 | 0 |
| 4 | -12 | -1 | 1 | 0 | 1 | 0 | 0 |

← DC Component (-749); AC Components →

5,563,726

DATA PROCESSOR FOR PREVENTING BLOCK DISTORTION FOR AN ACHROMATIC IMAGE WHEN IMAGE DATA ARE PROCESSED FOR CODING BY DIVIDING THEM INTO BLOCKS

BACKGROUND OF THE INVENTION

1. Field of the Invention

The present invention relates to a data processor for data compression of image data.

2. Description of the Prior Art

An international standard for color still image coding by a Joint Photographic Experts Group (JPEG) is a known coding technique for image data. In the color image coding, image data of red, green and blue are converted to a luminance data V and color difference data $W_R$ and $W_B$. The luminance data V and the color difference data $W_R$ and $W_B$ are coded separately. Then, the input data (luminance data V or color difference data $W_R$, $W_B$) is divided into processing blocks each of a prescribed size of pixel matrix (normally 8*8 pixel matrix), and image data in a processing block is subjected to discrete cosine transform (DCT) to generate DCT coefficients. Then, they are compressed as Huffman codes. The coded data are decoded when the document image is reproduced.

An image data of a document read by an image reader is an object of the above-mentioned coding. When an image data of a document of a single color or an achromatic color is read by an image reader, the image data will be all the same ideally. For example, in a case of a document of only red color, chroma has a certain value, but the AC components of the DCT coefficients will all be zero. On the other hand, in a case of an achromatic color image of black and white, chroma will be zero. However, errors occur actually on reading an image data because a read condition such as a quantity of exposure light or a reflectivity of a document paper may change.

As explained above, image data are usually divided into processing units of say 8*8 pixel matrix and they are processed for coding for each processing unit with discrete cosine transformation. Values of DC component and AC components of the DCT coefficients obtained after the discrete cosine transformation are affected by the existence of incorrect data caused by read errors. Therefore, if the incorrect values are decoded to reproduce a document image, a so-called block distortion occurs wherein colorfulness changes for each processing block and this deteriorates a quality of the entire reproduced document image.

SUMMARY OF THE INVENTION

An object of the present invention is to provide a data processor which can correct read errors or the like to prevent so-called block distortion for an achromatic image when image data are processed for coding by dividing them into blocks.

Another object of the present invention is to provide a data processor which removes colorfulness between blocks when differences are small between DC coefficients of adjacent processing blocks when image data are processed for coding by dividing them into blocks.

A further object of the present invention is to provide a data processor which can remove colorfulness errors between blocks in a monochromatic dot image when image data are processed for coding by dividing them into blocks.

In one aspect of the present invention, in data processing wherein image data are processed by dividing them into blocks, a chroma data W is obtained from the color difference data $W_R$ and $W_B$, and the color difference data $W_R$ and $W_B$ are corrected according to an amplitude of the chroma data W. For example, if the chroma W is smaller than a prescribed threshold value, the color difference data $W_R$ and $W_B$ are set as zero. Then, the so-called block distortion can be prevented. The degree of the correction may be changed to depend on the amplitude of the chroma data W.

In a different aspect of a data processor, in data processing wherein image data are processed by dividing them into blocks, DC coefficients of discrete cosine transform of adjacent blocks are compared with each other. The DC coefficient is a fundamental data among the DCT coefficients, while the AC coefficients represents of differences from the DC coefficient. When they represent a same image, if DC coefficients are different from each other, block distortion occurs. Then, if differences of DC coefficients of discrete cosine transform coefficients of adjacent blocks are small with each other, the DC coefficients are corrected to tend to have similar values.

In a further aspect of the invention, in data processing wherein image data are processed by dividing them into blocks, a comparator compares absolute values of AC components in the DCT coefficient data received from a discrete cosine transform section with a prescribed threshold value. Then, if absolute values of AC components in the DCT coefficient data are smaller than a prescribed threshold value, the values of the AC components are not sent to a coder because in such cases read errors or the like are thought to affect the AC components.

An advantage of the present invention is that read errors or the like in image data of a monochromatic image or an achromatic dot image can be corrected to remove erroneous colorfulness change.

Another advantage of the present invention is that a vivid image can be reproduced when the differences of color difference data between adjacent blocks are small.

A third advantage of the present invention is that read errors or the like in image data of a color image can be corrected to remove erroneous colorfulness change.

BRIEF DESCRIPTION OF THE DRAWINGS

These and other objects and features of the present invention will become clear from the following description taken in conjunction with the preferred embodiments thereof with reference to the accompanying drawings, and in which:

FIG. 7 is a diagram of DC coefficients in processing blocks in 3*3 blocking unit;

FIGS. 8A and 8B are diagrams of examples of DCT coefficients of a monochromatic image and of a monochromatic dot image, respectively;

DETAILED DESCRIPTION OF THE PREFERRED EMBODIMENTS

Figure 1:
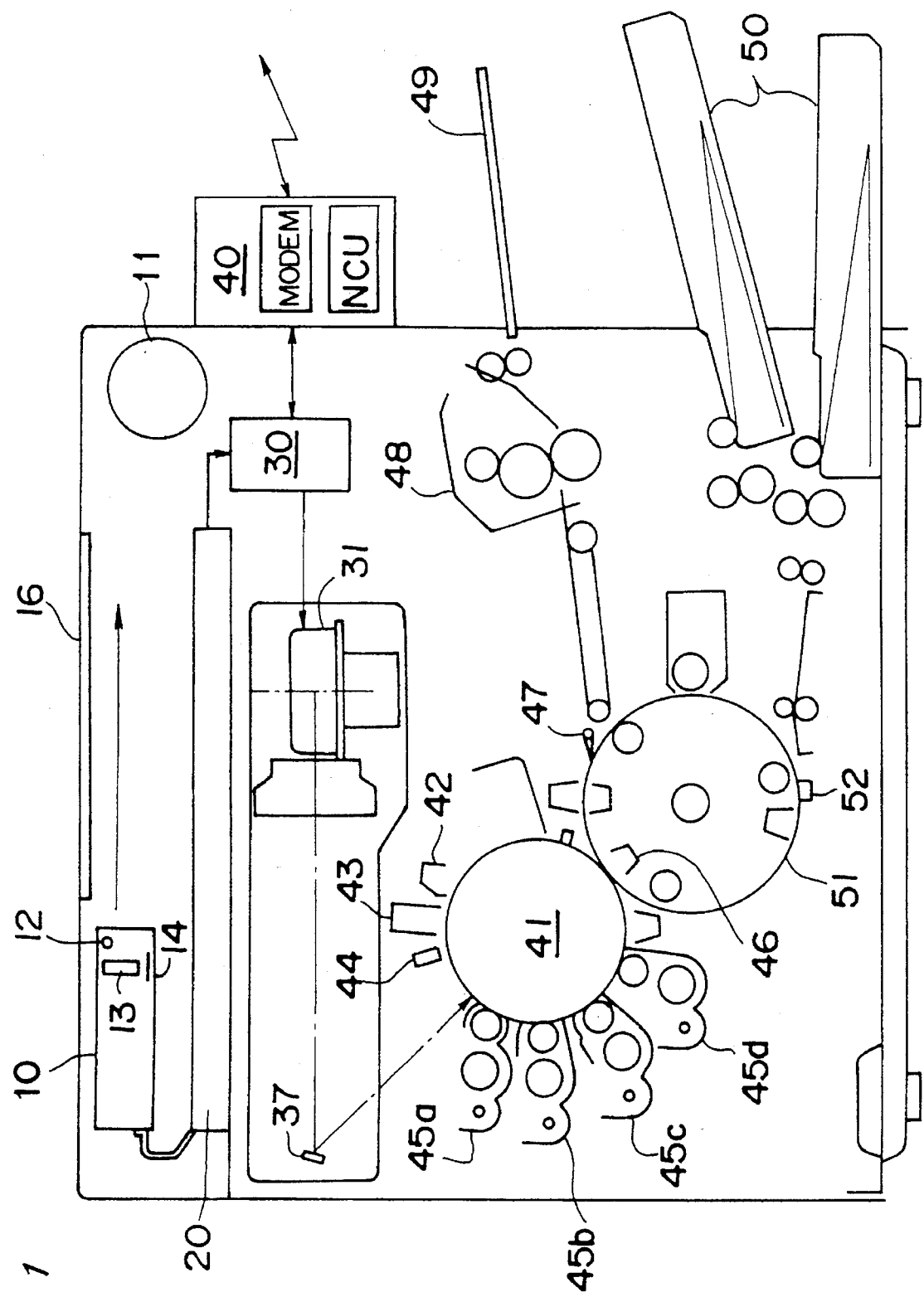
FIG. 1 is a schematic sectional view of a digital color copying machine with a facsimile function.

Referring now to the drawings, wherein like reference characters designate like or corresponding parts throughout the views, FIG. 1 shows a digital color copying machine which also serves as a facsimile apparatus, wherein image data of a document placed on a platen is read with an image reader and the image is printed on a paper with an electrophotographic process or sent to another facsimile apparatus through a telephone line.

A scanner 10 comprises an exposure lamp 12, a rod lens array 13 and a color image sensor 14. When image reading for copying or facsimile transmission is started, a document is put on a platen glass 16, and the scanner 10 is driven by a motor 11 to read image data of the document along a direction of an arrow as shown in the drawing. The exposure lamp 12 exposes the document, and a light reflected from the document is received through the rod lens array 13 to the color image sensor 14. A signal processor 20 processes the image data from the sensor 14 to supply digital image data red, green and blue to a coding unit 30. The coding unit 30 sends the image data to a print head 31. On the other hand, it also performs variable length coding of the image data and stores the code data. The code data may be transmitted to another facsimile apparatus via a facsimile transmission section 40 comprising a modulation and demodulation unit (MODEM) and a network control unit (NCU). The coding unit 30 will be explained later with reference to FIG. 2.

On image forming on a paper, a laser diode in the print head 31 modulates a light beam according the image data received from the coding unit 30, and the light beam is guided via a reflection mirror 37 to illuminate a surface of a photoconductor drum 41. The light beam forms an electrostatic latent image on the photoconductor drum 41 which has been sensitized at a predetermined potential. A development unit 45a–45d develops the latent image with toners of either of cyan, magenta, yellow and black. A paper in a tray 50 is fed to a transfer drum 51 and its top is chucked with a chucking mechanism 52. The toners adhered to the latent image is transferred to the parer wound on the transfer drum 51. Then, the remaining latent image is erased with a lamp 42. Toners of four colors of cyan, magenta, yellow and black are transferred successively to the paper. Then, the paper is isolated from the transfer drum 51 with a claw 47, fixed by a fixing unit 48 and discharged to a tray 49.

Figure 2:
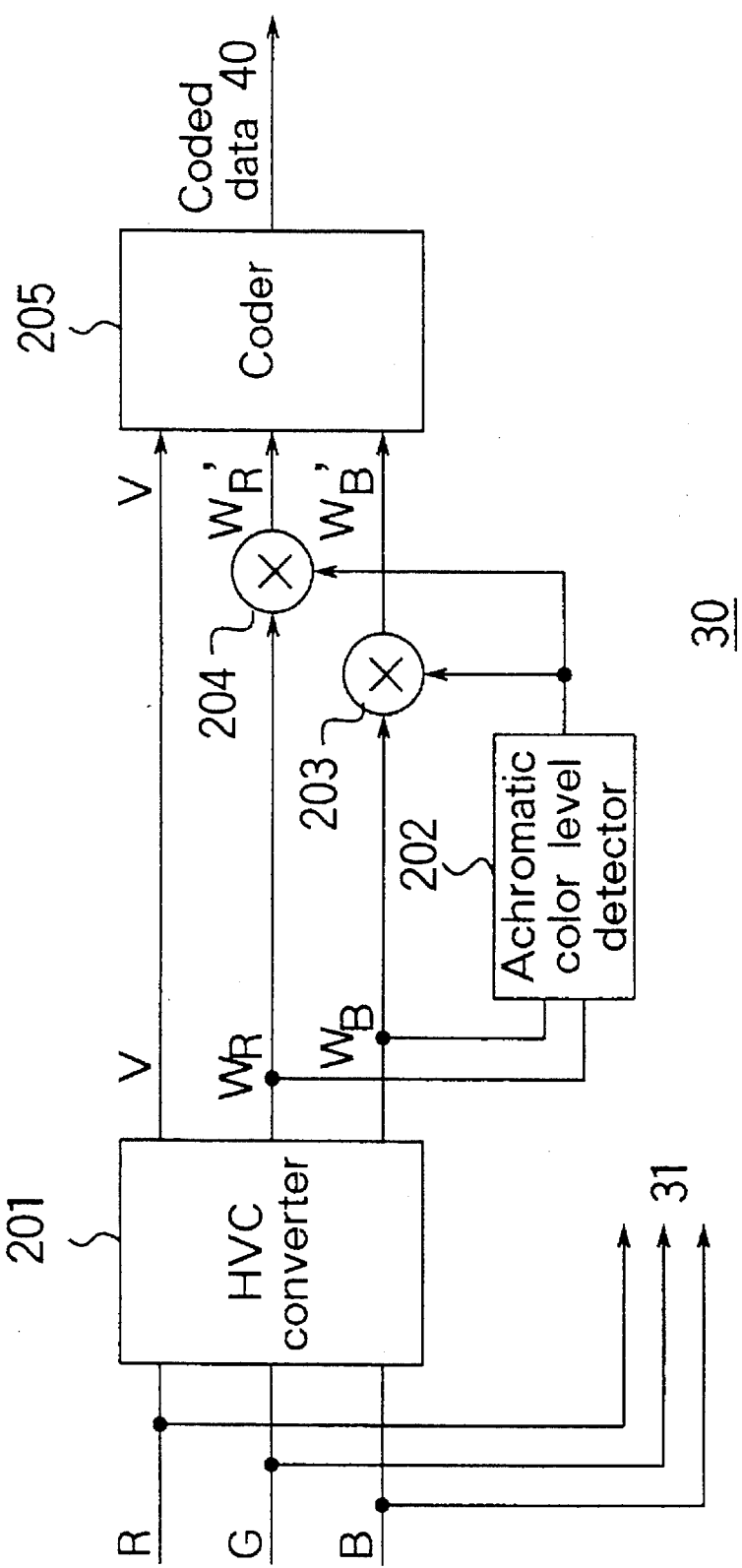
FIG. 2 is a block diagram of a coding unit.

FIG. 2 shows a block diagram of the coding unit 30. Image data of red (R), green (G) and blue (B) are supplied to an HVC converter 201 as well as to the print head 31. The HVC converter 201 converts the R, G and B image data into a luminance data V and two color difference data $W_R$ and $W_B$. In general, spectral luminous efficiency has a large weight at green, and it is approximated generally that R:G:B=0.229:0.589:0.114 for C light source at 2° visual field. The luminance data V can be determined according to the spectral luminous efficiency. On the other hand, the color difference data $W_R$ and $W_B$ are determined as follows:

$$W_B = B - V, \quad (1)$$

and $$W_R = R - V.$$

In other words, the luminance data V and the two color difference data $W_R$ and $W_B$ are determined in the HVC converter 201 by using a following matrix calculation:

$$\begin{pmatrix} V \\ W_R \\ W_B \end{pmatrix} = \begin{pmatrix} 0.299 & 0.587 & 0.114 \\ 1 & -0.837 & -0.163 \\ -0.337 & -0.663 & 1 \end{pmatrix} \times \begin{pmatrix} R \\ G \\ B \end{pmatrix} \quad (2)$$

An achromatic level detector 202 is provided to remove erroneous colorfulness change between processing blocks due to read errors or the like. If an image is achromatic, the DCT coefficients of the color difference data $W_R$ and $W_B$ will be zero theoretically. However, the DCT coefficients do not necessarily become zero due to image noises and the like. Then, the achromatic level detector 202 detects chroma of a data and checks if the data is achromatic or not. The decision of the achromatic level detector 202 is used to correct the color difference data $W_R$ and $W_B$.

The achromatic level detector 202 calculates a chroma W from the color difference data $W_R$ and $W_B$. The chroma W is calculated according to a following equation:

$$\begin{aligned} W &= (W_R^2 + W_B^2)^{1/2} \quad (3) \\ &= 255 \text{ when the chroma data is 8 bit} \end{aligned}$$

data and the calculated value exceeds 255.

Figure 3:
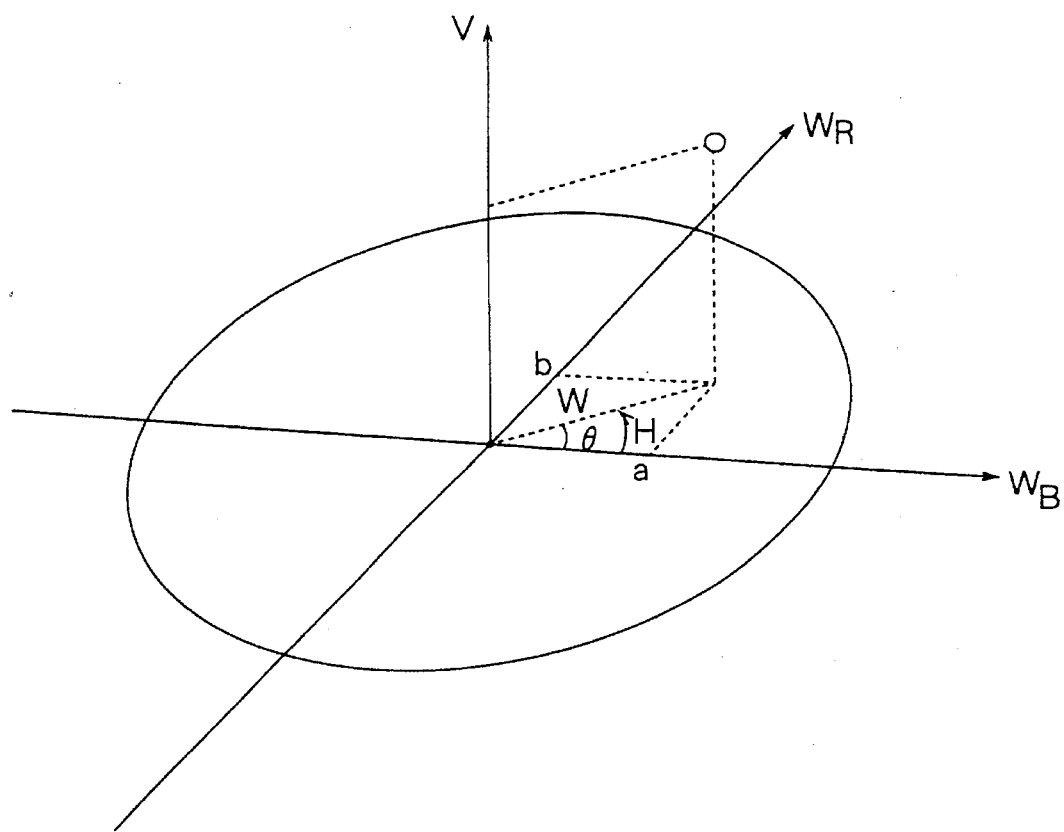
FIG. 3 is a diagram of a color space for illustrating a relation of color difference data $W_R$ and $W_B$ to hue data H and chroma data W in a space of V, $W_R$ and $W_B$.

In a color space of V, $W_R$ and $W_B$ shown in FIG. 3, a data point is denoted as an open circle. The color difference data $W_R$ and $W_B$ received from the HVC converter 201 are represented by two orthogonal coordinate axes in a hue plane, and a length of a vector from the origin to a point in the hue plane of $W_R$ and $W_B$ represents the chroma W, and the chroma decreases as the point approaches to the origin. The angle $\Theta$ in the hue plane represents a hue H.

Figure 4:
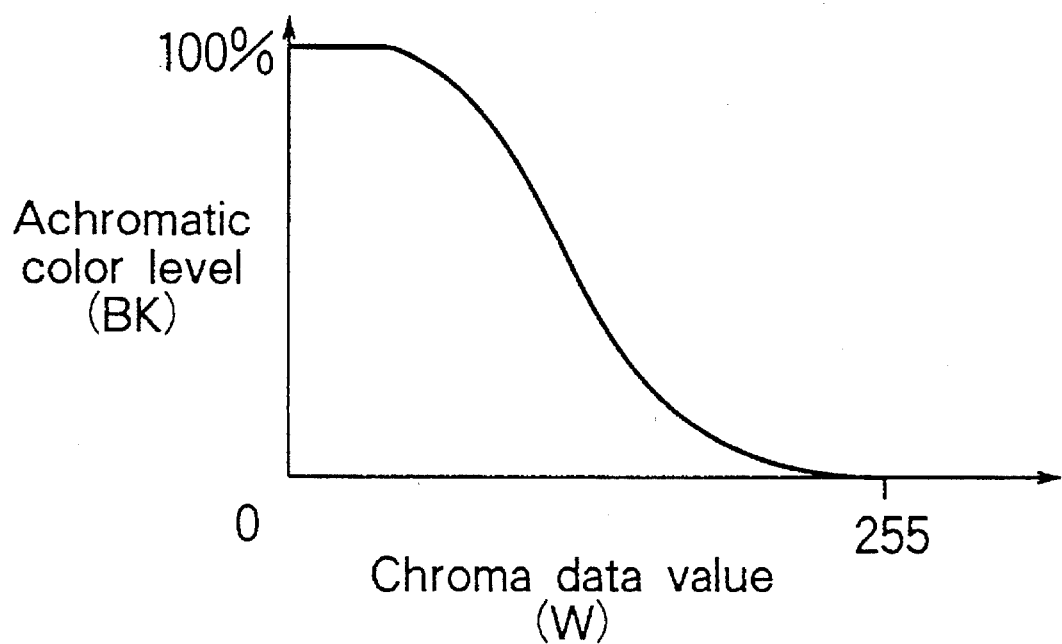
FIG. 4 is a graph of achromatic level (BK) plotted against chroma data (W)

The achromatic level detector 202 next determines achromatic level BK (%) according to the chroma data W. In an example shown in FIG. 4, the achromatic level BK changes nonlinearly against chroma data W. The achromatic level data BK has a value of 100% in a certain range of chroma data near the origin as shown in FIG. 4. In other words, if the color is achromatic, the value BK is 100%. The achromatic level detector 202 determines the achromatic level B by using a table included therein.

In order to correct the color difference data $W_R$ and $W_B$, the achromatic level detector 202 sends (1−BK/100) value to multipliers 203 and 204 to multiply it with the color difference data $W_R$ and $W_B$, respectively, and sends multiplied or corrected data $W_R'$ and $W_B'$ to a coding unit 205. Therefore, if the data is decided to be completely achromatic (BK= 100%), the corrected data $W_R'$ and $W_B'$ are all set as zero. On the other hand, if the data is decided to be completely chromatic (BK=0%), the corrected data $W_R'$ and $W_B'$ are equal to $W_R$ and $W_B$. However, for a data between the two extreme cases, the color difference data $W_R$ and $W_B$ can be controlled according to the achromatic level BK. This nonlinear relation is appropriate for a half-tone image.

In a second example, the achromatic level BK may be set at two levels, in contrast to FIG. 4, by comparing with a prescribed threshold value. That is, it is 100% when the chroma data W is smaller than the prescribed threshold value, otherwise it is set as 0. Such a two level processing is simple but appropriate for example to a character image because of characteristics of color recognition of human eyes.

The coding unit 205 performs coding of the color difference data $W_R'$ and $W_B'$ and the luminance data V. Thus, errors which occur when the scanner 10 reads an achromatic document image can be corrected effectively on basis of color data W, so that block distortion in a reproduced image can be prevented.

In the present embodiment, the correction of the color difference data is performed before discrete cosine transform, but it may be performed after discrete cosine transform. However, if the correction of the color difference data is performed before discrete cosine transform, the efficiency of data processing is better.

Figure 5:
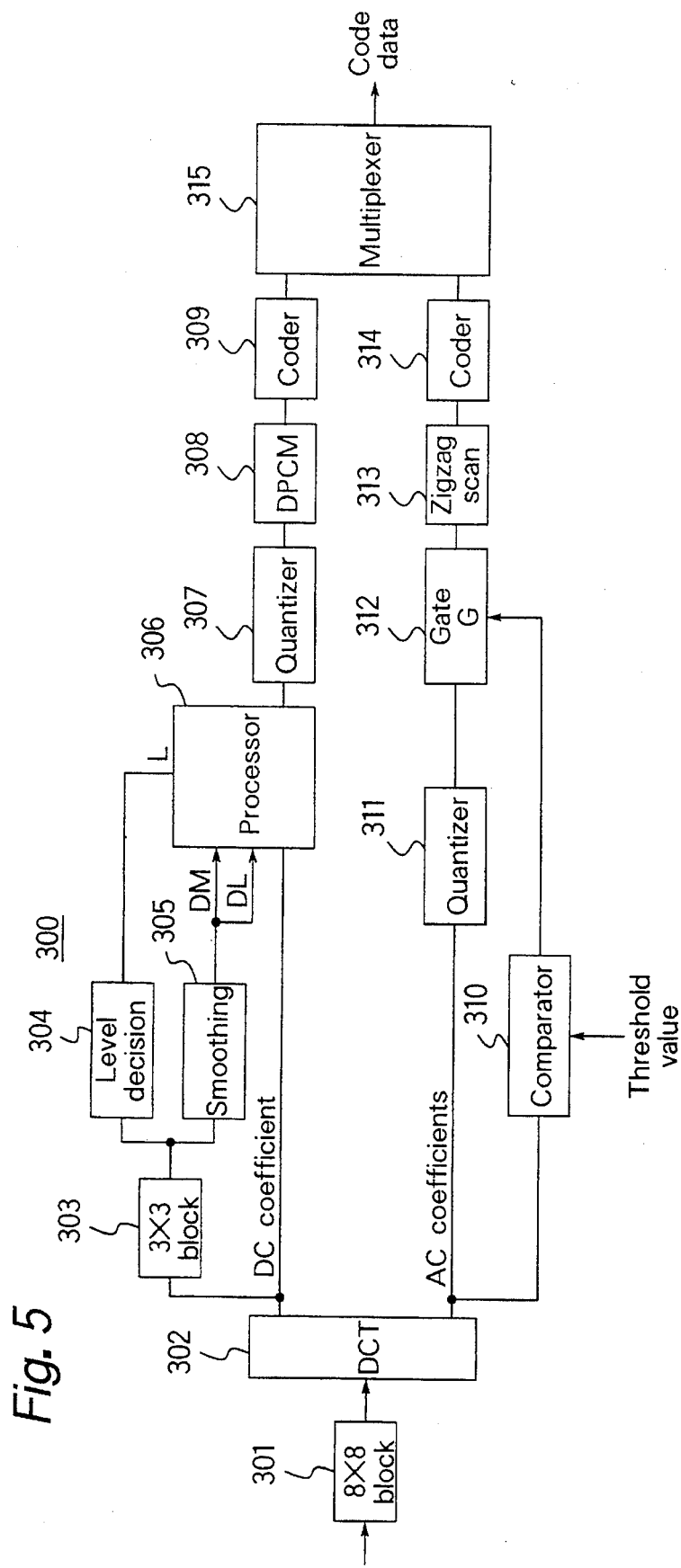
FIG. 5 is a block diagram of a coding section for color difference data $W_R$ and $W_B$ for correcting read errors of a monochromatic image.
Figure 6:
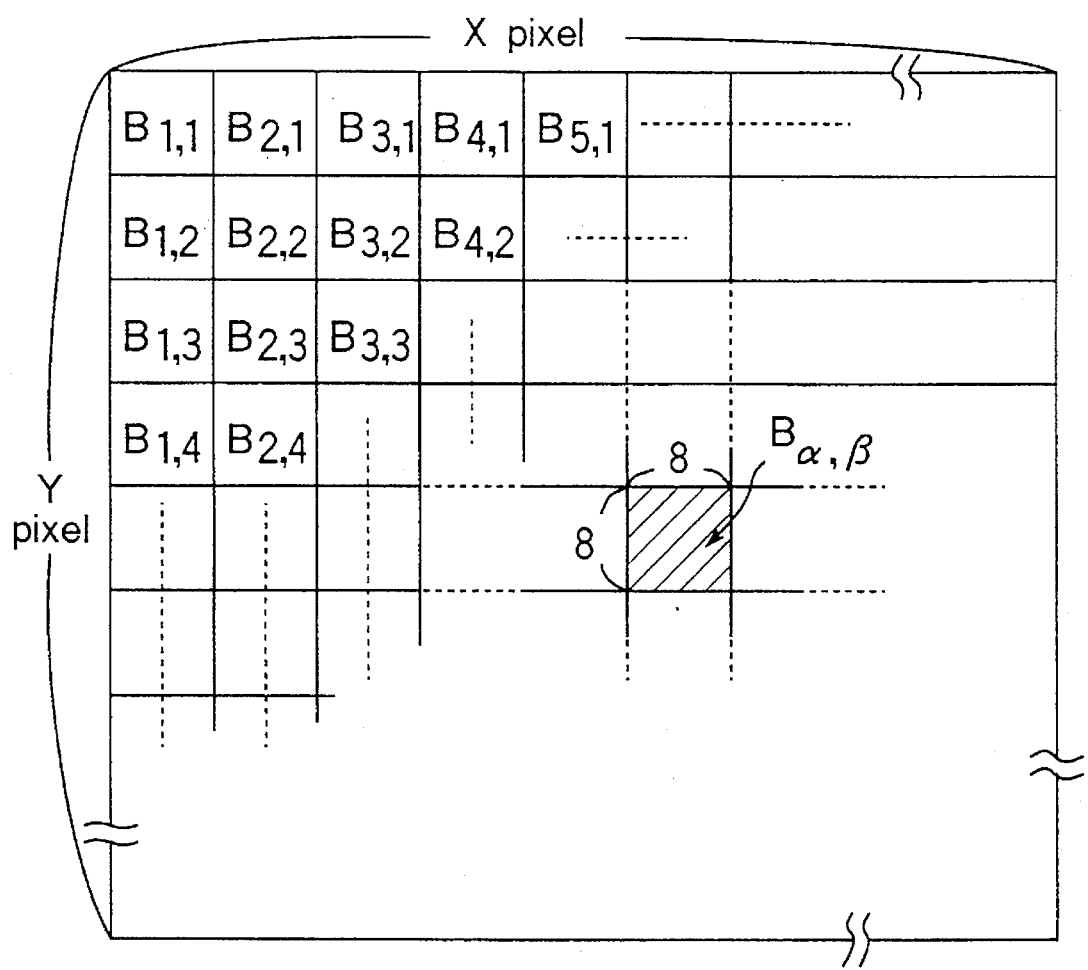
FIG. 6 is a diagram of 8*8 blocking in an image of X*Y pixels.

FIG. 5 shows a processing block 300 for the color difference data $W_R'$, $W_B'$ in the coding unit 205 shown in FIG. 2. Image data of a document is first received by a 8*8 blocking section 301, and the 8*8 blocking section 201 divides the image data into processing blocks $B_{\alpha,\beta}$ of 8*8 pixel matrices as shown in FIG. 6. If an image comprises X*Y pixels, the number of the processing blocks is (X/8)*(Y/8).

A DCT (discrete cosine transform) section 302 performs discrete cosine transform of image data in a processing matrix to DCT coefficients. In the discrete cosine transform, data $P_{x,y}$ (x, y=0, 1, ..., 7) of pixels in a processing matrix are transformed into 64 DCT coefficients $S_{u,v}$ (u, v=0, 1, ..., 7) according to Eq. (4).

$$S_{u,v} = \frac{1}{4} C_u C_v \sum_{x=0}^{7} \sum_{y=0}^{7} (P_{x,y} - L_s) \cos\frac{(2x+1)U\pi}{16} \cos\frac{(2y+1)v\pi}{16} \quad (4)$$

wherein x and y denote positions in the processing matrix, u and v denote positions in a matrix of DCT coefficients, $$C_u, C_v = 1/\sqrt{2}, \quad ; u, v = 0$$
$$= 0, \quad ; \text{otherwise}$$

and $$L_s = 128, \quad ; \text{8-bit } P_{x,y}$$
$$= 2048. \quad ; \text{12-bit } P_{x,y}$$

Among the 64 DCT coefficients $S_{u,v}$, a coefficient $S_{0,0}$ is called as DC coefficient while the others are called as AC coefficients. The DC coefficient means an average of the data in the 8*8 pixels in a processing matrix. If a pixel value $P_{x,y}$ is represented as an 8-bit data, $L_s$ is defined as 128 as an expected value of the DC coefficient is taken as 128. Then, if an average of pixel values is 128, the DC component becomes zero. As shown in FIG. 5, the DCT section 302 sends the DC coefficient and the AC coefficients through different paths.

As explained above, the DC component represents an average value of data of 8*8 pixels. In the coding unit 205, the DC component of the DCT components in a specified processing block is smoothed more strongly stepwise according to a difference of the DC coefficient $D_{\alpha,\beta}$ of the specified processing block $B_{\alpha,\beta}$ from those of the DC components of adjacent eight processing blocks shown in FIG. 7. That is, the DC coefficient $D_{\alpha,\beta}$ of the processing block $B_{\alpha,\beta}$ from the DCT section 302 is sent to a 3*3 blocking section 303.

The 3*3 blocking section 303, a level decision section 304, a smoothing section 305 and a DC coefficient processor 306 are provided to remove colorfulness noises between the 8*8 blocks. When color image is compressed with discrete cosine transform, the values of DCT coefficients between 8*8 blocks become different. The differences become small for an image of uniform color, but they do not vanish completely and this causes colorfulness noises. The 3*3 blocking section 303 is provided to compile nine DC coefficients of 3*3 block including $D_{\alpha,\beta}$ in order to correct the DC component by taking into account DC components of adjacent processing blocks. As will be explained later, if the level decision section 304 decides that a degree of the difference of the color difference data $W_R'$ and $W_B'$. If the degree is decided to be small, the same densities (or DCT coefficients) are adopted to remove colorfulness noises and to reproduce a vivid color.

In this processing, the 3*3 blocking section 303 receives nine DC coefficients $D_{\alpha,\beta}$ of eight adjacent processing blocks with $B_{\alpha,\beta}$ at a center, as shown in FIG. 7, wherein $D_{\alpha,\beta}$ represents a value of the DC coefficient of a processing block $B_{\alpha,\beta}$. Therefore, the 3*3 blocking section 303 compiles $D_{\alpha-1,\beta-1}$, $D_{\alpha,\beta-1}$, $D_{\alpha+1,\beta-1}$, $D_{\alpha-1,\beta}$, $D_{\alpha,\beta}$, $D_{\alpha+1,\beta}$, $D_{\alpha-1,\beta+1}$, $D_{\alpha,\beta+1}$ and $D_{\alpha+1,\beta+1}$.

As shown in FIG. 5, the 3*3 blocking section 303 sends the DC coefficients of the nine processing blocks to a smoothing section 305. The smoothing section 305 calculates two smoothed values $DM_{\alpha,\beta}$ and $DL_{\alpha,\beta}$ from DC coefficients by following Equations (5) and (6) according to two kinds of 3*3 smoothing filters:

$$DM_{\alpha,\beta} = (1/16)(1*D_{\alpha-1,\beta-1} + 2*B_{\alpha,\beta-1} + 1*B_{\alpha+1,\beta-1} + \quad (5)$$
$$2*B_{\alpha-1,\beta} + 4*B_{\alpha,\beta} + 2*B_{\alpha+1,\beta} + 1*B_{\alpha-1,\beta+1} +$$
$$2*B_{\alpha,\beta+1} + 1*B_{\alpha+1,\beta+1}).$$

$$DL_{\alpha,\beta} = (1/9)(D_{\alpha-1,\beta-1} + B_{\alpha,\beta-1} + B_{\alpha+1,\beta-1} + \quad (6)$$
$$B_{\alpha-1,\beta} + B_{\alpha,\beta} + B_{\alpha+1,\beta} + B_{\alpha-1,\beta+1} +$$
$$B_{\alpha,\beta+1} + B_{\alpha+1,\beta+1}).$$

$DM_{\alpha,\beta}$ represents a DC coefficient of the processing block $B_{\alpha,\beta}$ for smoothing of an intermediate degree with denominator of 16, while $DL_{\alpha,\beta}$ represents a DC coefficient of the processing block $B_{\alpha,\beta}$ for smoothing of averaging. They are sent to the DC coefficient processor 306. The processor 306 also receives as-received color difference data $W_R'$ and $W_B'$. Therefore, the processor 306 receives three kinds of the color difference data $W_R'$ and $W_B'$ and sends one of them according to a level signal L which will be explained next.

On the other hand, the level decision section 304 receives the nine DC coefficients from the 3*3 blocking section 303 and instructs the processor 306 to use which of the three kinds of data. The level decision section 304 compares the DC coefficient $D_{\alpha,\beta}$ of the specified processing block $B_{\alpha,\beta}$ with each DC coefficient of the eight adjacent processing blocks $D_{\alpha-1,\beta-1}$, $D_{\alpha,\beta-1}$, $D_{\alpha+1,\beta-1}$, $D_{\alpha-1,\beta}$, $D_{\alpha+1,\beta}$, $D_{\alpha-1,\beta+1}$, $D_{\alpha,\beta+1}$, $D_{\alpha+1,\beta+1}$ and decides a level of the differences between the nine blocks. That is, if we represents $$A = D_{\alpha-1,\beta-1} - D_{\alpha,\beta},$$

$$B = D_{\alpha,\beta-1} - D_{\alpha,\beta},$$

$$C = D_{\alpha+1,\beta-1} - D_{\alpha,\beta},$$

$$E = D_{\alpha-1,\beta} - D_{\alpha,\beta},$$

$$F = D_{\alpha+1,\beta} - D_{\alpha,\beta},$$

$$g = D_{\alpha-1,\beta+1} - D_{\alpha,\beta},$$

$$H = D_{\alpha,\beta+1} - D_{\alpha,\beta}$$

and $$I = D_{\alpha+1,\beta+1} - D_{\alpha,\beta},$$

the level is decided by using threshold values γ and θ determined on the basis of experimental data. The level is sent to the DC coefficient processor 306.

(a) If all values of A, B, C, E, F, G, H and I are smaller than a threshold value γ, the level decision signal L is set as "10". This is a case where differences among the DC coefficients around the central processing block are small. Then, the processor 306 adopts the $DL_{\alpha,\beta}$ as the DC coefficient. The value $DL_{\alpha,\beta}$ is a simple average of the DC coefficients of the nine processing blocks. Because there is a gradual change of color difference signals, a simple smoothing thereof is used.

(b) If all values of A, B, C, E, F, G, H and I are larger than a threshold value γ and smaller than another threshold value θ, the level decision signal L is set as "01". In this case, differences of the DC coefficients are not so small, but relatively large around the central processing block. This case is found for example for a half-tone image. Then, the processor 306 adopts the $DL_{\alpha,\beta}$ as the DC coefficient. The value $DL_{\alpha,\beta}$ is an average of the DC coefficients of the nine processing blocks with a large weight of $D_{\alpha,\beta}$.

(c) If at least one of the values of A, B, C, E, F, G, H and I does not satisfy the above-mentioned condition (a) or (b), the level decision signal L is set as "00". This corresponds to all cases other than the above-mentioned cases (a) and (b).

The DC coefficient processor 306 receives the above-mentioned decision level L and the three kinds of DC coefficients, an as-received value, $DM_{\alpha,\beta}$ and $DL_{\alpha,\beta}$, and it selects the as-received value $D_{\alpha,\beta}$ without smoothing to a quantization section 307 if the decision level L="00", $DM_{\alpha,\beta}$ if the decision level L="01", and $DL_{\alpha,\beta}$ if decision level L="10". for example, by performing the above-mentioned processing on the DC coefficient of the processing block $B_{\alpha,\beta}$, if the decision level L="10", subtle differences between processing blocks due to read errors, image errors or the like can be smoothed to correct differences of colorfulness in a reproduced image If the decision level L="01", a half-tone image can be corrected to have smooth colorfulness change in a reproduced image.

Then, the quantizing section 307 quantizes a data received from the processor 306 with a quantization table, and a differential pulse-coded modulation (DPCM) section 308 calculates a difference of the DC coefficient of the processing block $B_{\alpha,\beta}$ from that of a previous processing block $B_{\alpha-1,\beta}$, and the coder 309 performs a variable length coding of the difference.

On the other hand, the AC coefficients $B_{\alpha,\beta}$ from the DCT unit 302 are quantized by a second quantizing section 311 with a quantization table. However, if the AC coefficients include read errors, a quality of a reproduced image is deteriorated. FIG. 8A shows an example of DCT coefficients of a monochromatic image, while FIG. 8B shows an example of DCT coefficients of a dot image consisting of monochromatic minute dots. As shown in FIG. 8A, the absolute values of the AC coefficients of a monochromatic image have values near zero. On the other hand, as shown in FIG. 8B, the absolute values of the AC coefficients of a dot image do not necessarily have values near zero. If as received AC coefficients of such a monochromatic dot image having read errors are quantized and coded, a color shift at high frequencies appears obviously in an image reproduced by decoding the data.

Then, in the coding device of the embodiment, a comparator 310 is provided in order to determine if the received AC coefficients supplied have to be corrected or not. The DCT coefficient section 302 also supplies the AC coefficients successively to the comparator 310. If absolute values of all the AC coefficients in the processing block $B_{\alpha,\beta}$ are smaller than a threshold value T determined experimentally (T=12 for FIG. 8B), it is considered that differences of the AC components are all ascribed to read errors or the like of a monochromatic dot image, and all AC components are set as zero by a gate 312 in order to avoid a change in colorfulness in a reproduced image. Therefore, the comparator 310 decides that the image is a monochromatic dot image and sends a gate signal to the gate 312 which makes all the AC coefficients zero because a monochromatic dot image will have all zero AC coefficients. The above-mentioned processing corrects the read errors or the like and improves a quality of a reproduced image. Further, because only the DC coefficient is coded, a compression ratio of information quantity can also be improved.

Figure 9:
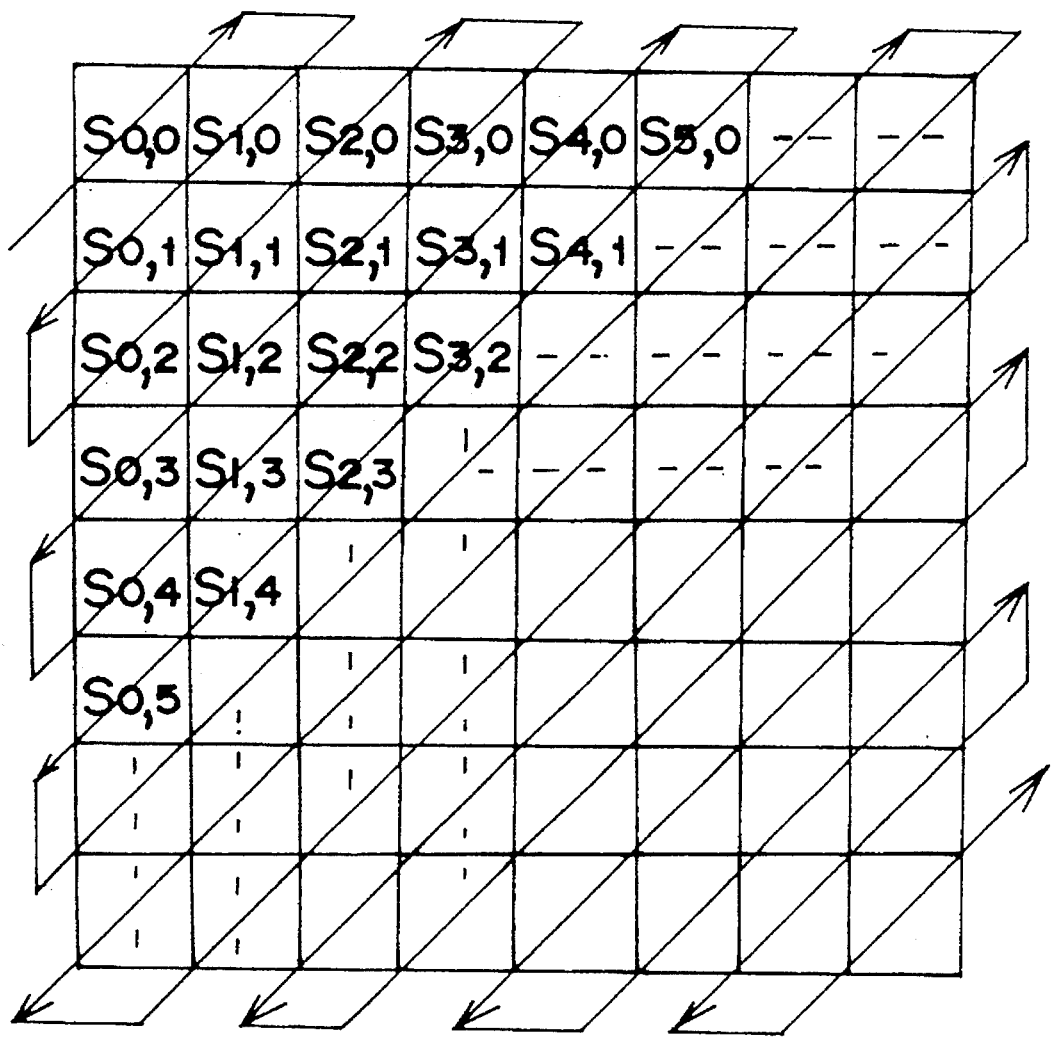
FIG. 9 is a diagram of a matrix of DCT coefficients $S_{\alpha,\beta}$ and a scan order therein in zigzag scan.

The AC coefficients supplied through the gate 312 are next sent to a zigzag scan section 313. The zigzag scan section 313 scans the AC components $S_{u,v}$ (u, v; u=1–8, v=1–8) in the order of arrows shown in FIG. 9 so as to reorder them in a one-dimensional array. Then, a coder 314 processes the reordered data for entropy coding.

A multiplexer 315 multiplexes the data coded by the coders 309 and 314 and sends a multiplex data to the facsimile transmission unit 40 or the like. Decoding of the image data is performed by a reverse processing.

Figure 10:
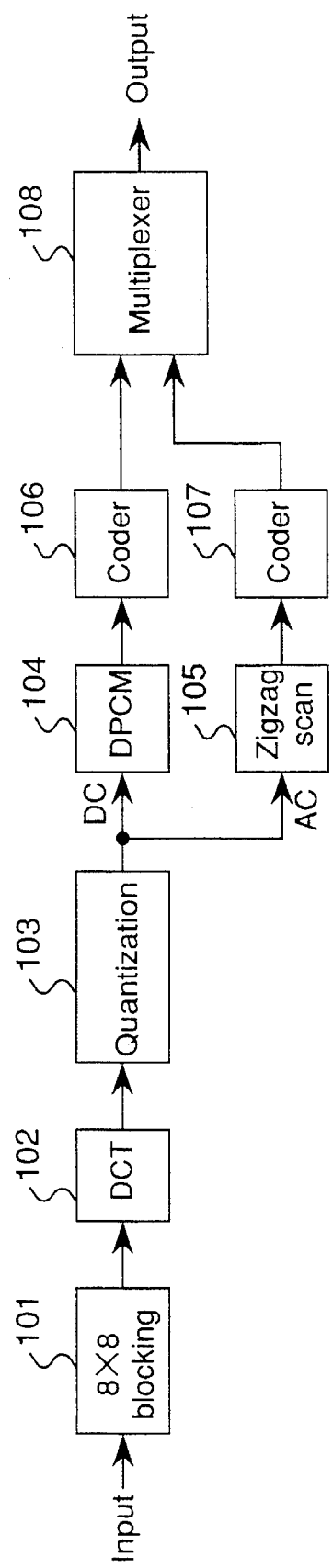
FIG. 10 is a block diagram of a coding section for image data according to an international standard.

The luminance data V is coded according to the above-mentioned prior art international standard. FIG. 10 shows a processor block in the coding unit 300 for processing luminance data V in pixel data of a document image. Luminance data V is sent to an 8*8 blocking section 101, which divides pixel data into blocks $B_{\alpha,\beta}$ of processing pixel matrices of 8*8 pixels similarly to the blocking section 301.

The DCT section 102 performs discrete cosine transform of the luminance data V of an 8*8 block similarly to the DCT section in FIG. 5 and sends the DCT coefficients to a quantization section 103. As shown in FIG. 10, a DC coefficient among the DCT coefficients is supplied to a differential pulse-coded modulation (DPCM) section 104, while the AC coefficients are supplied to a zigzag scan section 105. The DPCM section 108 calculated a difference between the DC component of a processing block $B_{\alpha,\beta}$ from that of a preceding block $B_{\alpha-1,\beta}$ (refer FIG. 6), and the difference is subjected to variable length coding in the coder 106. On the other hand, the zigzag scan section 105 scans the AC components $S_{u,v}$ (u, v; u=1–8, v=1–8) in the order shown with arrows in FIG. 9 in order to reorder them in a one-dimensional array. A coder 107 processes the reordered data for entropy coding. A multiplexer 108 multiplexes the data coded by the two coders 106 and 107 and sends a multiplex data to the facsimile transmission unit 40 or the like. Decoding of the image data is performed by reverse the above-mentioned processing.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data processor comprising:

an HVC converter for converting an image data of red, green and blue of a document image to a luminance data V and color difference data $W_R$ and $W_B$;

a chroma calculator for calculating a chroma data W from the color difference data $W_R$ and $W_B$ determined by said HVC converter;

a data correction section for correcting the values of the color difference data $W_R$ and $W_B$ according to an amplitude of the chroma data W calculated by said chroma calculator; and a coding section for performing variable length coding of the luminance data obtained by said HVC converter and the color difference data determined by said HVC converter or corrected by said data correction section.

2. The data processor according to claim 1, wherein said data correction section corrects the color difference data $W_R$ and $W_B$ as zero if the amplitude of the chroma data W calculated by said chroma calculator is smaller than a prescribed threshold value.

3. The data processor according to claim 1, wherein said data correction section corrects the color difference data $W_R$ and $W_B$ by multiplying them with a value as a function of the chroma data W calculated by said chroma calculator, which value changing from zero to one nonlinearly according to the chroma data W.

* * * * *